US012313492B2

(12) United States Patent
Cui et al.

(10) Patent No.: US 12,313,492 B2
(45) Date of Patent: May 27, 2025

(54) ESTIMATION OF A PARAMETER OF A CAVITY ON AN INTEGRATED PHOTONIC CHIP

(71) Applicant: Arizona Board of Regents on behalf of the University of Arizona, Tucson, AZ (US)

(72) Inventors: Chaohan Cui, Tucson, AZ (US); Linran Fan, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 18/599,933

(22) Filed: Mar. 8, 2024

(65) Prior Publication Data

US 2024/0302246 A1 Sep. 12, 2024

Related U.S. Application Data

(60) Provisional application No. 63/451,571, filed on Mar. 11, 2023.

(51) Int. Cl.
*G01M 11/00* (2006.01)
(52) U.S. Cl.
CPC ........ *G01M 11/331* (2013.01); *G01M 11/332* (2013.01)

(58) Field of Classification Search
CPC .......................... G01M 11/331; G01M 11/332
See application file for complete search history.

(56) References Cited

U.S. PATENT DOCUMENTS

2010/0303122 A1\* 12/2010 Popovic .................. G02F 1/011
359/290

OTHER PUBLICATIONS

Cui, Chaohan et. al., "Simple Criterion for the Coupling Condition of a Micro-Resonator", 2023, Optica Publishing Group, Tucson.

\* cited by examiner

*Primary Examiner* — Thanh Luu
(74) *Attorney, Agent, or Firm* — Quarles & Brady LLP; Yakov Sidorin

(57) ABSTRACT

A low-cost, data-fitting-free robust methodology configured to distinguish the coupling condition of an arbitrary resonance, applicable in one example to a micro-resonator of a multi-micro-resonator optical integrated circuit. The method includes registering the resonator cavity response to a rapid-phase shift of the on-resonance pump field. From the registered feature of the time-dependent transmission characteristic acquired with an optical detector, the sign of a difference between the values of intrinsic loss of the cavity and the coupling rate $(\gamma_i - \gamma_c)$ is directly read out, thereby resulting not only in a more accurate estimation of the intrinsic loss as compared with related art, but also in facilitating practically-realizable inspection of massively integrated photonic platforms with micro-resonators.

20 Claims, 4 Drawing Sheets

ESTIMATION OF A PARAMETER OF A CAVITY ON AN INTEGRATED PHOTONIC CHIP

CROSS-REFERENCE TO RELATED APPLICATIONS

This US Patent application claims priority from and benefit of the U.S. Provisional Patent Application No. 63/451,571 filed on Mar. 11, 2023, the disclosure of which is incorporated herein by reference.

TECHNICAL FIELD

Embodiments of the present invention relate generally to methodologies of characterization of an operational component of an integrated photonic circuit (IPC) and, in particular, to a robust and accurate characterization of a parameter of an individual constituent integrated photonic micro-resonator (a photonic cavity) device chosen from numerous nanophotonic devices the operations of which are wavelength-dependent or that are massively integrated on the same IPC under conditions that prevent the use of interrogation of such chosen micro-resonator with a frequency-chirped optical signal.

RELATED ART

Integrated photonics platforms are leading at least the near-term evolution of optical instruments, including optical filters, sensors, and computing units. Moreover, the enriched nonlinear properties of the integrated photonic platforms promise the development of high-efficiency optical sources configured to operate at new frequencies, and passive isolators. Among various integratable photonic devices, high-quality micro-resonators play versatile roles in these applications. Remarkably, such micro-resonators retain the unrivaled capability of generating highly-squeezed light, which is essential for advanced quantum photonics in sensing, communication, and computing applications.

As is well recognized in related art, the linear property of a micro-resonator is primarily determined by two parameters—the intrinsic loss of the optical resonator cavity $\gamma_i$ and the coupling rate $\gamma_c$ between the cavity and the bus optical waveguide that is cooperated with such micro-resonator. Different photonic applications require the use of micro-resonators with different characteristics: for example, an operationally decent squeezed light source requires an extremely over-coupled micro-resonator cavity characterized by $\gamma_c \gg \gamma_i$, whereas a sensor, for example, is substantially more operationally precise when $\gamma_c \approx \gamma_i$.

In a fiber-based or free-space optical resonator, the intrinsic loss and the coupling rate parameters can be relatively easily characterized and/or ascertained by probing the coupling section (that is, the optical waveguide leading to the resonator cavity) and the cavity itself separately. However, as a skilled person well knows, the operational problem of reliable characterization immediately arises and manifests in a situation when one must measure a parameter of an integrated photonic micro-resonator. Here, understandably, the direct detection of the intra-cavity optical field is practically impossible since the light is guided inside the waveguide channel. The addition of an auxiliary coupler to the optical circuitry immediately adds complexity and unintended loss to the overall system, which further degrades its performance. Even more disappointingly, however, the traditional and currently used characterization methodology commonly referred to as a ring-down technique or methodology (that utilizes a probing light signal with a wavelength scanned across the spectral resonance of the target optical resonator to obtain the transmission spectrum and then judiciously fitting such transmission spectrum) simply cannot decisively distinguish between different coupling regimes. As a skilled artisan readily appreciates, this deficiency is caused by the fact that the transmission spectrum can only indicate the absolute value of the difference between the intrinsic loss of the micro-resonator cavity and the coupling rate—that is, the absolute value of $|\gamma_i - \gamma_c|$—and cannot identify the sign of the difference between these two parameters, which remains elusive.

Furthermore, this widely used in related art "ring-down" methodology—according to which all cavity parameters could be simultaneously fitted in one fast frequency scanning of an optical signal (for example, frequency chirping, performed at speeds that are much faster than the decay of the cavity of the target micro-resonator)—has rather limited practical implementation due to not only complexity and high-cost of apparatus required to carry-out such scanning, but also due to uncertainty and/or lack of assurance of the validity of the method near the critical-coupling condition, as a skilled artisan readily appreciates. Specifically, the lack of distinguishability between the coupling regime characterization of the micro-resonator near the critical-coupling condition simply substantially negates the advantage of sensing the absorption spectrum with the use of the ring-down approach. Moreover, even if the interrogation of a target micro-resonator with the chirped optical signal were, somehow, satisfactory, the near-by presence of other multiple micro-resonators on the same integrated optical chip in near proximity to the target micro-resonator—each having its own spectral resonance—immediately scrabbles the reading representing the parameter of the target resonator because of inevitable optical coupling among multiple present micro-resonators.

SUMMARY OF THE INVENTION

Embodiments of the invention provide an apparatus that includes a source of pump light, a phase-shifting system, an optical detection system and electronic circuitry operably coupled with the optical detection system. The source of pump light is configured to generate light at a pre-determined frequency. The phase-shifting system is configured to introduce a shift into a phase of the light received from the source of pump light to transform the light to a phase-shifted light and to deliver the phase-shifted light to a first location. The optical detection system is configured to receive the phase-shifted light from a second location that is different from the first location upon propagation of the phase-shifted light from the first location to the second location. The electronic circuitry is configured to determine, based on parameters of the phase-shifted light registered at the second location when a resonant medium is present between the first and second locations, a coupling rate representing said resonant medium (here, the resonant medium has a resonance frequency substantially equal to the pre-determined frequency, an input port at the first location to receive the phase-shifter light from the system, and an output port at the second location to outcouple the phase-shifted light that has traversed the resonant medium from the input port to the output port towards the optical detection system). In at least one specific implementation of the apparatus, at least one of the following conditions is satisfied: the resonant medium includes an optical resonator, and the resonant medium includes constituent optical micro-resonator of an integrated photonic circuitry containing multiple optical micro-resonators. Embodiments further provide a method for using an embodiment of such apparatus, which includes the steps of (i) coupling, into the input port of the resonant medium, the light having the pre-determined frequency substantially equal to the resonance frequency of the resonant medium; (ii) while maintaining said pre-determined frequency substantially constant, substantially inverting a phase of said light during time having a duration shorter than the lifetime characterizing the resonant medium; and (iii) with the use of electronic circuitry and based on an optical response acquired at the output port with an optical detector of the optical detection system, generating indicia representing the coupling rate.

Embodiments of the invention additionally provide a method that includes (a) a step of coupling, into an input port of a chosen optical micro-resonator of multiple optical micro-resonators contained in an integrated photonic circuitry, a pump light having an operational wavelength that is substantially equal to a resonant wavelength of the chosen optical micro-resonator; (b) a step of substantially inverting a phase of the pump light at the input port during time that is smaller than a lifetime of the chosen optical micro-resonator while, at the same time, maintaining said operational wavelength substantially constant; and (c) a step of generating user-perceivable indicia that represents a cavity coupling rate of the chosen optical micro-resonator based on an optical response acquired at an output port of the chosen optical micro-resonator with an optical detector of an optical detection system. In at least one specific implementation of the method, the step of coupling may include coupling the pump light that has already traversed an optical medium configured to be subjected to an electrical signal having a pre-determined temporal profile and/or the method may be devoid of using an optical frequency-chirped signal and/or characterized by having the step of substantially inverting to include introducing a phase shift substantially equal to $\pi$-phase shift to the pump light according to a driving waveform substantially equal to a step-function. Alternatively or in addition, and substantially in every implementation, the method may include a step of acquiring the optical response at the output port of the chosen optical micro-resonator by measuring at the output port a time-dependent output optical power. Optionally, the step of substantially inverting the phase of the pump light includes inverting the phase of the pump light periodically in time. Alternatively or an addition, and substantially in every implementation, the method may include a step of comparing the time-dependent output power substantially continuously recorded at the output port within a pre-determined duration of time with a value of an average output power recorded at the output port within said pre-determined duration of time to determine a coupling regime of the chosen optical micro-resonator. Optionally—and substantially in every implementation of the method—the step of generating indicia may include generating, with (optionally programmable) electronic circuitry, a user-perceivable output representing whether a sign of a difference between the value of time-dependent output power and the value of the average output power changed at any moment within the pre-determined duration of time. Optionally, the step of generating indicia may include generating a first indicia that identifies the chosen optical micro-resonator as an under-coupled optical micro-resonator when a value of the optical response does not cross a pre-determined threshold level of the optical response, and/or generating a second indicia that identifies the chosen optical micro-resonator as an over-coupled optical micro-resonator when the value of the optical response does cross the pre-determined threshold level of the optical response. In at least one case, pre-determined threshold level of the optical response may include a level corresponding to an average value of said optical response.

Embodiments further provide a computer program product for characterizing an optical micro-resonator on an integrated photonic circuitry, the computer program product including a computer usable tangible non-transitory storage medium having computer readable program code thereon, the computer readable program containing: program code for operating a source of pump light having an operational wavelength substantially equal to a resonant wavelength of the optical micro-resonator; program code for operating a phase-shifting electronic circuitry operably coupled with a phase-shifting device to substantially invert a phase of a pump light received by the phase-shifting device from the source of pump light during time that is smaller than a lifetime of the optical micro-resonator; and program code for determining a cavity coupling rate of the optical micro-resonator based on an optical response acquired at an output port thereof in response to phase-shifted light being coupled into an input port thereof.

BRIEF DESCRIPTION OF THE DRAWINGS

The invention will be better understood by referring to the following Detailed Description of Specific Embodiments in conjunction with the Drawings, of which:

FIG. 1B: The $\pi$-phase shift pump modulated by the arbitrary-wave generator (AWG) and the phase modulator (PM). Inset is the zoomed-in rising edge of the square wave used in this experiment. FIG. 1A: a schematic of a specific non-limiting example of an experimental apparatus. Here, AWG: arbitrary waveform generator. PM: phase modulator. FIG. 1C: Responses of two coupling conditions directly read from the oscilloscope. The two coupling regimes are distinct since an over-coupled cavity (curve 150) can show (resolves) transmission lower than the initial condition. However, an under-coupled cavity (curve 160) cannot.

FIG. 2A: The joint slow-scanned spectrum shows extinction ratios. The color indicates the coupling regime. FIG. 2B: The coupling rates fitted from the slow-scanned spectrum and the corresponding $\pi$-phase-shifted testing with fitting error bars. Solid lines are potential trends if the micro-ring is ideal. FIG. 2C: The corresponding cavity response to the $\pi$-phase-shifted testing. The resonances are picked as dots in FIG. 2A. Solid lines represent results of simulations with the realistic phase shift applied to the pump.

FIG. 3A: Ideal, FIG. 3B: simulated, and FIG. 3C: measured responses of the under-coupled resonance at 1504.7 nm ($\gamma \approx 0.45$ GHZ). FIG. 3D: Ideal, FIG. 3E: simulated, and FIG. 3F: measured responses of the over-coupled resonance at 1551.7 nm ($\gamma \approx 0.29$ GHz). The normalized power transmission is shown on a logarithmic scale and truncated for better visualization.

Figure 1B:
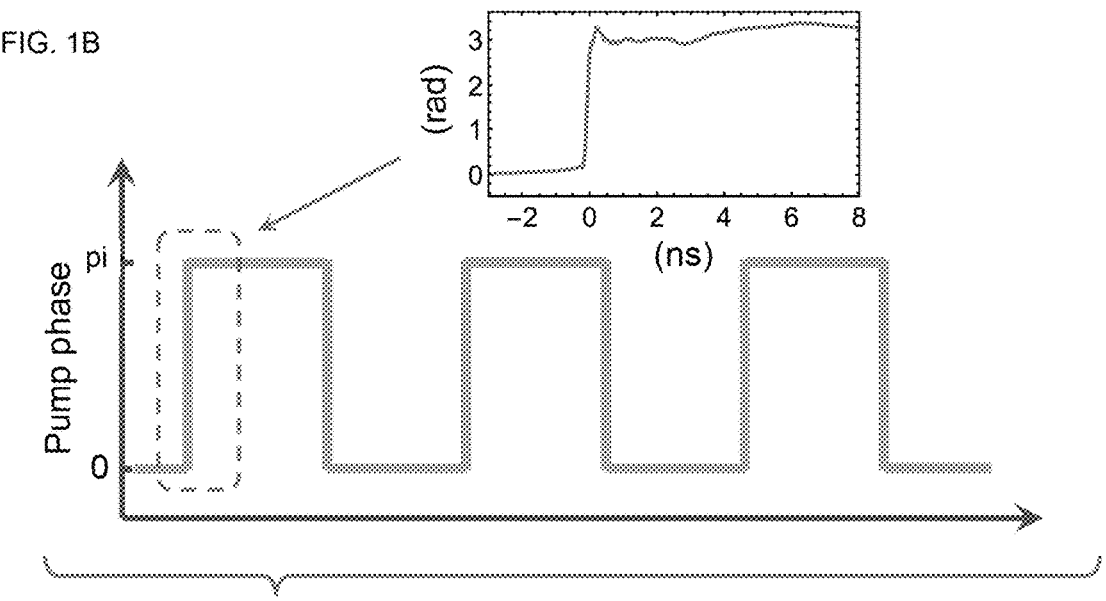
FIGS. 1A, 1B, 1C illustrate an embodiment of the invention configured to calibrate cavity coupling rates.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

A person of skill readily appreciates that practical ability to accurately and robustly characterize individual micro-resonators as part of optical integrated circuits containing a multitude of such resonators is, indeed, indispensable. As was already alluded to above, one conventionally used approach of slowly scanning the wavelength of a probing light across the resonance of a micro-resonator and fitting the transmission spectrum is not capable of distinguishing the coupling regimes of such micro-resonator because the transmission spectrum is indicative of only the absolute value of $|\gamma_i-\gamma_c|$, and not of the sign of this difference. One widely used trick to infer this sign is by scanning multiple adjacent resonances around the target one and then looking for (attempting to identify) wavelength-dependent changes in extinction ratios. For an ideal waveguide coupler, the coupling rate tends to grow when the wavelength is longer, while the loss rates show less dependence on wavelength. By assuming these two trends hold, when the extinction ratios grow in value at longer wavelengths, the adjacent resonances can be viewed as under-coupled. And, to the contrary, if the extinction ratios become lower, the adjacent resonances are over-coupled. However, the practical device in the application cannot always support the assumption of both trends. For example, when the resonator cavity operates as an absorption sensor, the loss induced by targets makes intrinsic loss rates wavelength-dependent. Moreover, if the micro-resonators are massively integrated with other wavelength-dependent components in the same circuitry, the empirical trends may not hold. Thus, it is necessary to have a more distinctive criterion to distinguish the coupling regime(s) for the target resonance of an integrated photonic cavity.

As to the practice of the ring-down approach, the frequency chirping speed is required to be not only stable but also much higher (faster) than the decay of the cavity, $\omega \gg 1/(\gamma_i+\gamma_c)^2$. Hence, the memory effect produced by the cavity will induce interference patterns in the transmitted power spectrum after the scanning frequency is scanned across the on-resonance value. By utilizing the exact speed of frequency scanning in the appropriate formula, the linear properties of the cavity can be fitted all at once. An over-coupled cavity usually shows a more extensive amplitude of the pattern than an under-coupled cavity since more previously-accumulated intra-cavity power is leaking to the output port.

The shortcomings of the ring-down technique stem from its practical intricacy. First, a well-calibrated stably-chirped pump source is necessary to produce the pattern for a reliable fitting afterward, and an ultra-fast detector is required to resolve the pattern. Aside from the technical challenges, nontrivial modifications are needed if other components in the optical integrated circuit have dispersion or frequency-dependent loss near the resonance. Furthermore, this method can hardly be valid (and is considered to be practically unreliable) near the critical-coupling condition since the fitted curve has no divergence there.

According to the idea of the invention, the practical, persisting in related art problems associated with optical characterization of an individual optical micro-resonator on an integrated optical circuitry chip containing other operationally wavelength-dependent nanophotonic devices are solved by applying a novel experimental methodology that is devoid of the use of (that is, does not employ) a spectrally-chirped optical characterization signal and/or devoid of the use of a fitting procedure currently utilized by related art. In particular, the proposed micro-resonator characterization methodology employs the detection of the optical power transmission response of the chosen micro-resonator cavity (of the IPC) to a substantially on-resonance optical pump field the phase of which is subjected to a substantially π-phase shift. Based on the temporal profile of such response, a precise and substantially undeniable conclusion can be made as to whether the target micro-resonator operates in the regime of the "under-coupled cavity" or the regime of the "over-coupled cavity," thereby providing a clear identification of the practical application in which such particular micro-resonator of the IPC should be used.

The Optical Cavity Response to a π-Phase Shift of the On-Resonance Pump Light Delivered to the Optical Cavity.

The general dynamics of the optical field in a linear high-Q one-side-coupled cavity can be expressed as $da/dt= (i\Delta-\gamma/2)a+\sqrt{\gamma_c}a_{in}$, where a and $a_{in}$ stands for the intra-cavity and input pump fields. $\Delta$ and $\gamma=\gamma_i+\gamma_c$ are the cavity detuning and total loss rate in the unit of frequency, respectively. At the coupling section, the intra-cavity field and the reflected input pump field merge into the output field with the boundary condition $a_{out}=a_{in}-\sqrt{\gamma_c}a$. In the traditional approach of probing the resonance, the system can reach the steady state at any A if the frequency sweeping speed is low enough. Then, the transmitted power spectrum obeys $P_{out}(\Delta)/P_{in}=|1-(2\gamma_c-2i\Delta)/(\gamma-2i\Delta)|^2$ with the maximum extinction ratio $|(\gamma_i-\gamma_c)/\gamma|^2$ on resonance. By fitting the transmission spectrum, the values of $\gamma$ and $|\gamma_i-\gamma_c|$ can be obtained accordingly.

Figure 1A:
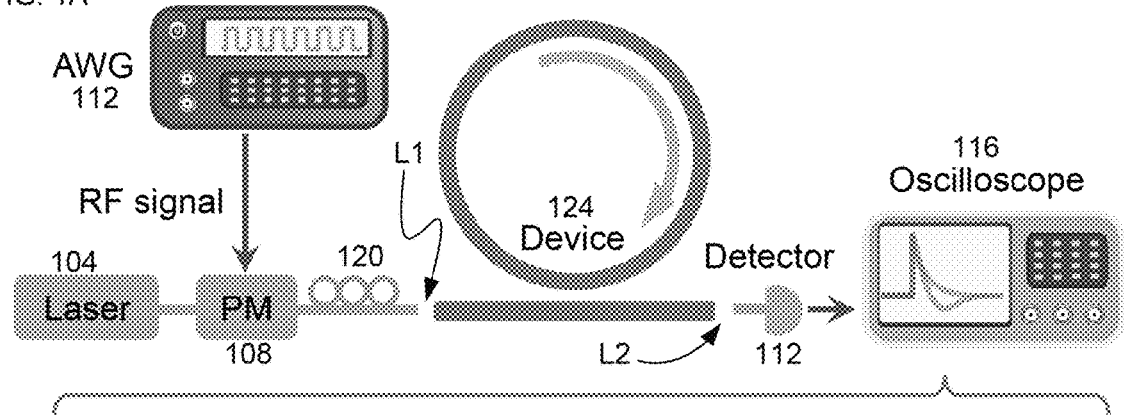
Figure 1C:
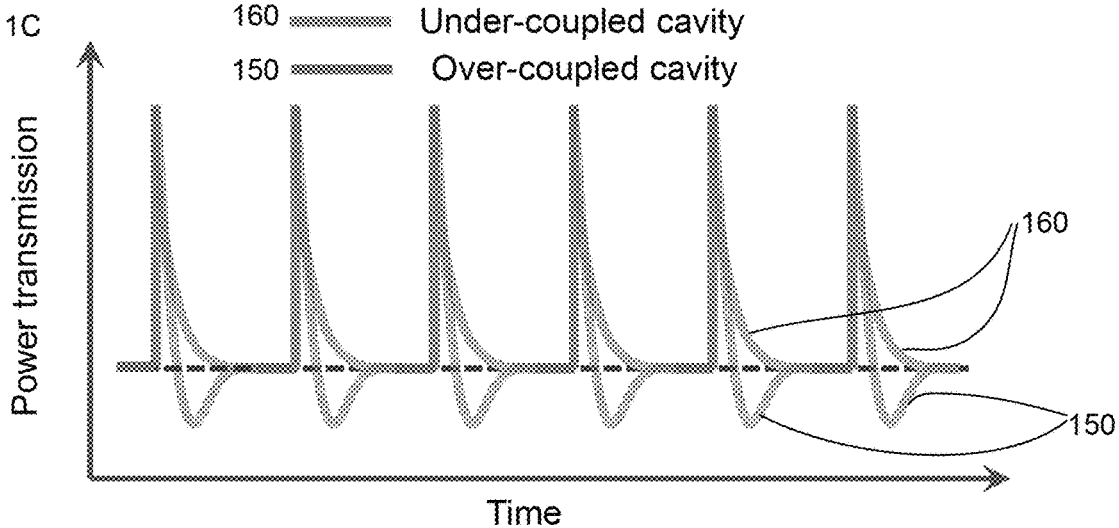

In reference to FIGS. 1A, 1B, and 1C, an implementation of the idea of the present invention utilizes an on-resonance source of pump light that has a constant power but undergoes a "pi"-phase shift—that is, an inversion of phase—at a pre-determined transition time that, preferably, smaller than the cavity's lifetime (in a specific non-limiting example illustrated in FIG. 1B, such phase shift is shown as being substantially instantaneous, with the pump phase dependency resembling a step-function). While the schematic depiction of FIG. 1A is that of one specific and non-limiting embodiment of the apparatus of the invention, the skilled artisan will readily appreciate that, generally, an embodiment of the apparatus includes a source of pump light 104, a phase-shifting system (represented in the example of FIG. 1A by the combination of a PM 104 and the AWG 108), an optical detection system 112, and electronic circuitry (optionally-programmable; represented in FIG. 1A by an oscilloscope 116 and/or processor, not shown) that is operably coupled with the optical detection system. The source of pump light is configured to generate light at a pre-determined frequency. The phase-shifting system is configured to introduce a shift into a phase of the light received from the source of pump light to transform the light to a phase-shifted light, which is the delivered to a first spatial location (L1). The optical detection system is configured to receive the phase-shifted light from a second location that is different from the first location upon propagation of the phase-shifted light from the first location to the second spatial location (L2) (in the specific non-limiting example of FIG. 1A—with the use of an optical fiber 120). The electronic circuitry is configured to determine, based on parameters of the phase-shifted light registered at the second location when a judiciously chosen resonant medium (represented in FIG. 1A by a micro-resonator device 124) is present between the first and second locations, a coupling rate characterizing this resonant medium. (Notably, the resonant medium is appropriately chosen to have a resonance frequency substantially equal to the pre-determined frequency, an input port at the first location to receive the phase-shifted light from the phase-shifting system, and an output port at the second location to outcouple the phase-shifted light that has traversed the resonant medium from the input port to the output port towards the optical detection system). In at least one specific implementation of the apparatus, at least one of the following conditions is satisfied: the resonant medium includes an optical resonator, and the resonant medium includes constituent optical micro-resonator of an integrated photonic circuitry containing multiple optical micro-resonators.

In one specific case, when the phase of the pump light is inverted substantially instantaneously, the time profile of the pump light delivered to the micro-resonator can be expressed as $$a_{in}(t) = \sqrt{\frac{P_{in}}{\hbar\omega}}(1 - 2\Theta(t))$$

with $\Theta(t)$ the step function in time. When $t<0$, the intra-cavity optical field is balanced at the on-resonance steady state with the minimum transmitted power. At $t=0$, the system is disturbed by the substantially instant phase change in the pump light phase, which immediately affects the interference at the output coupling between the cavity and the bus waveguide. The pump light phase is switched to the opposite phase value, and so is the steady-state solution of the current system, whereas the intra-cavity optical field remains the same due to the memory effect of the cavity. At this point, the intra-cavity field starts the transition toward the new steady state under the new pump condition.

At the beginning of the transition, more intra-cavity power is exiled from the cavity due to constructive interference at the output port, resulting in a jump in transmitted power $P_{out}(t=0)=P_{in}|(\gamma_i+3\gamma_c)/\gamma|^2$. Thereafter, the phase-shifted pump light is continuously coupled into the optical cavity (the optical resonator device 124 in the specific example of FIG. 1A), interferes destructively, and drains the intra-cavity optical field. After a certain amount of time, the intra-cavity field is depleted, and the still-delivered pump light begins to resupply the cavity. This newly-established intra-cavity field joins the interference with the pump light at the output port. During the accumulation of this new intra-cavity field, and if the cavity of the micro-resonator is over-coupled, a specific moment of time $t_0>0$ arrives when the out-coupled cavity field substantially reaches the level of the supplied pump light and the transmitted optical power reaches a zero level. The analytical solution to the transmitted power during the transition is $$\frac{P_{out}(t)}{P_{in}} = \begin{cases} \left|\frac{\gamma_i - \gamma_c}{\gamma}\right|^2, & t < 0 \\ \left|1 - \frac{2\gamma_c}{\gamma}\left(1 - 2e^{-\frac{\gamma t}{2}}\right)\right|^2, & t \geq 0 \end{cases}$$

If the cavity is over-coupled, i. e. $\gamma_c>\gamma/2>\gamma_i$, the zero transmitted power happens at $$t_0 = -\frac{2}{\gamma}\ln\left[\frac{1}{2}\left(1 - \frac{\gamma}{2\gamma_c}\right)\right].$$

In contrast, if the cavity of the micro-resonator is under-coupled, its lower coupling rate ensures that the transmitted power at any $t>0$ is never lower than the power at $t<0$.

According to the idea of the invention, the practical criterion for determining the coupling regime of a given target micro-resonator subject to such measurement is to identify $\min[P_{out}(t>0)/P_{out}(t<0)]$. If this value is lower than 1, then the optical cavity 124 undergoing the measurement is over-coupled. Otherwise, such cavity is under-coupled.

The skilled artisan having the advantage of this explanation will now readily appreciates that the proposed approach is starkly advantageous over the ring-down technique in multiple aspects. The step-like (substantially instantaneous) change in phase of light can be readily applied by a simple phase modulator with a transition time less than $1/\gamma$ to reveal the memory effect of the cavity. With the use of a simple commercially-available phase modulator 108 with, say, a 40 GHz bandwidth, this practical criterion of the determination of the coupling regime of the resonator cavity can be applied for resonances with Q-factors no less than $10^4$, which is more than sufficient for almost every kind of micro-cavities. As far as the optical detector utilized during the measurement is concerned, the only practical consideration is that the detector bandwidth be on the same order of magnitude as that of $\gamma$, in order to resolve the lowest level of power transmission. (A detector with a larger bandwidth of course may be used, but this is not necessarily required.) Therefore, the requirements imposed by the idea of the invention on required testing/measurement apparatus are incomparably weaker and looser than those that must be satisfied when the conventional ring-down technique of related art is employed. Besides, the testing methodology only utilizes a signal at one, substantially constant and unchangeable during the measurement optical frequency, thereby providing a very substantial practical advantage over the ring-down method in that the proposed methodology can be used for characterization for chosen of the multiple micro-resonator on the same chip without any interference with other micro-resonators or other optically dispersive components present on the chip either before or after the chosen, target resonator.

EXAMPLE: EXPERIMENTAL RESULTS

Figures 2A, 2B:
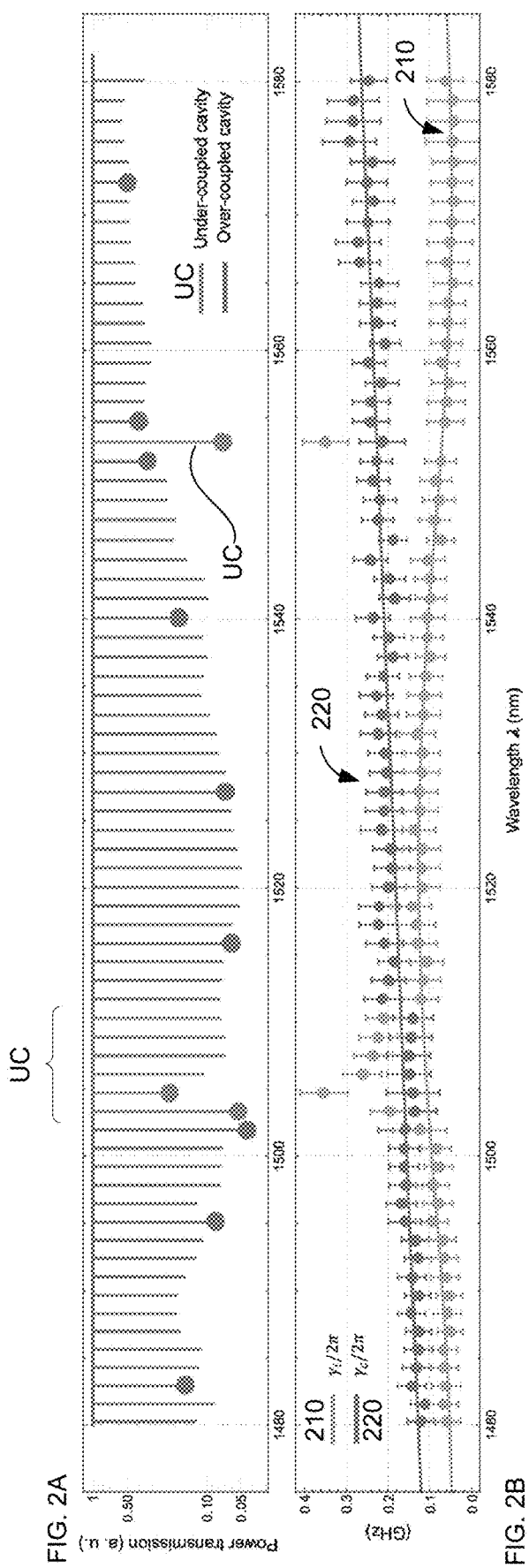
FIG. 2A, 2B, 2C illustrate experimental results for calibrating coupling regimes of an on-chip micro-ring cavity.

In one specific, non-limiting case, a silicon-nitride ring resonator was fabricated with a wrap-around waveguide and tested with the use of the proposed approach. By slowly scanning the wavelength of the utilized tunable pump laser, the broad transmission spectrum of the ring resonator was determined, as shown in FIG. 2A From this transmission spectrum, $\gamma$ and $|\gamma_i-\gamma_c|$ for each resonance were obtained from fitting the spectrum. The quality factors of resonances were nearly one million, and the spectrum showed a major trend where resonances at longer wavelengths seemed to be over-coupling. However, there were also exceptions and uncertainty. To distinguish the two coupling regimes, the $\pi$-phase shift pump was further applied to examine each of the multiple resonances individually.

Figure 2C:
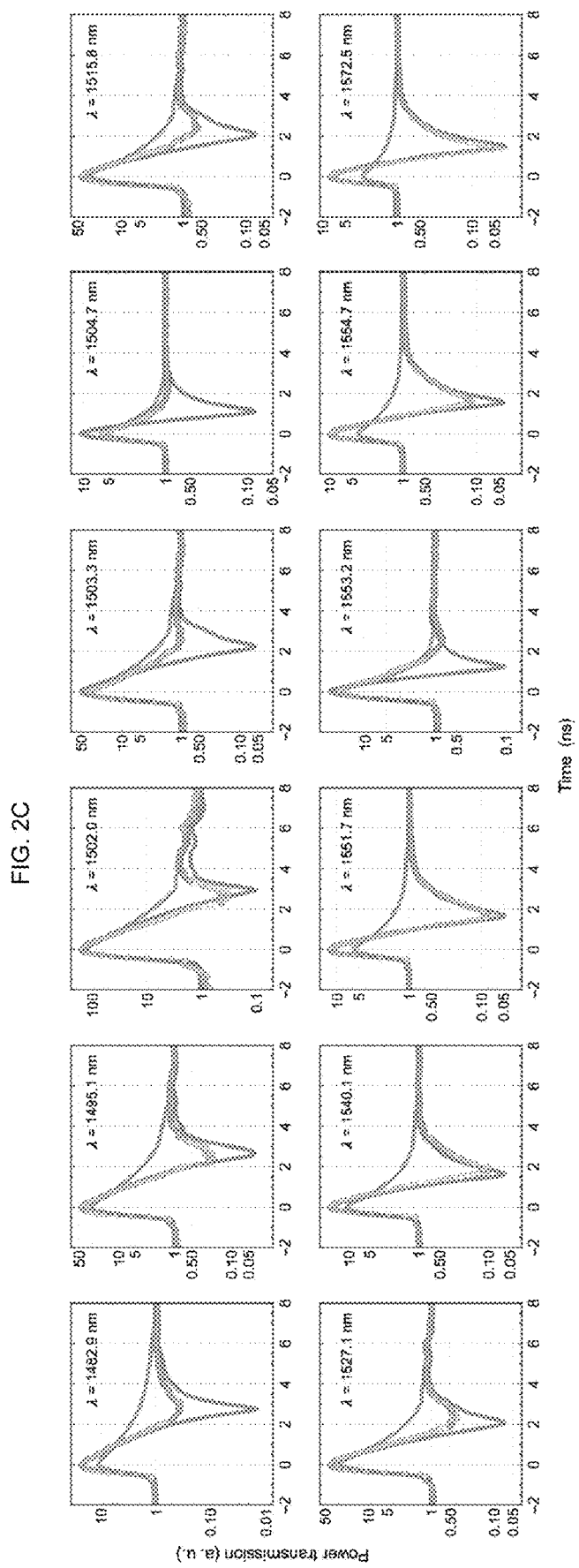
Figure 3A:
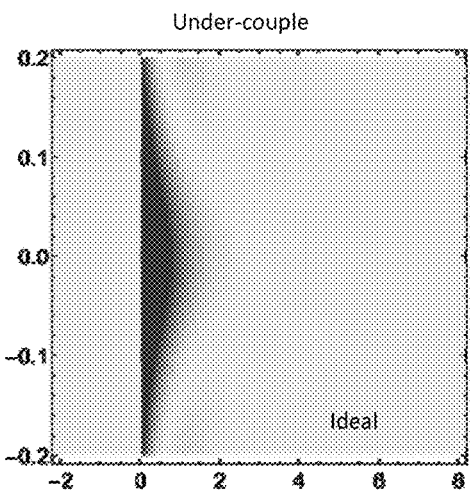
FIGS. 3A, 3B, 3C, 3D, 3E, and 3F depict responses of resonator cavities with detuning dependence.
Figure 3D:
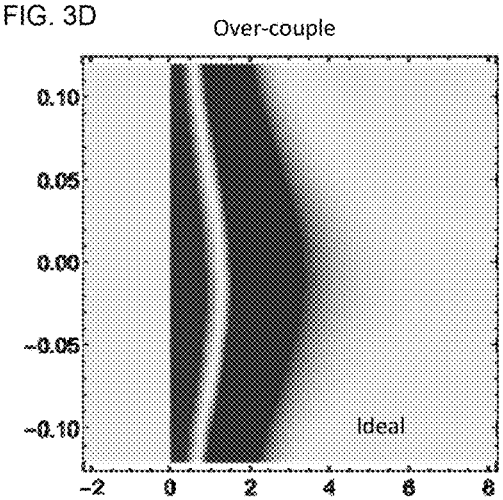
Figure 3B:
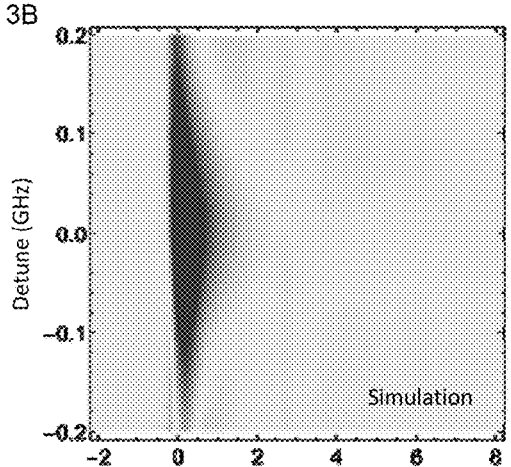
Figure 3E:
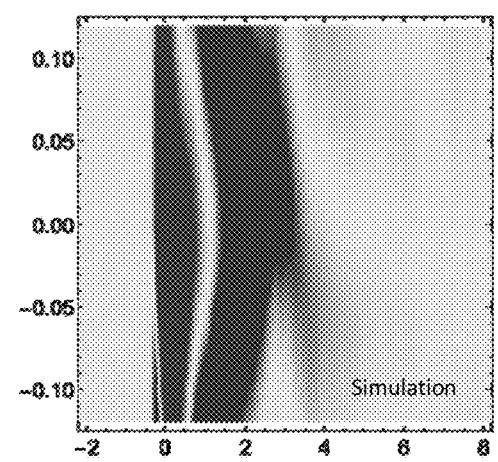
Figure 3C:
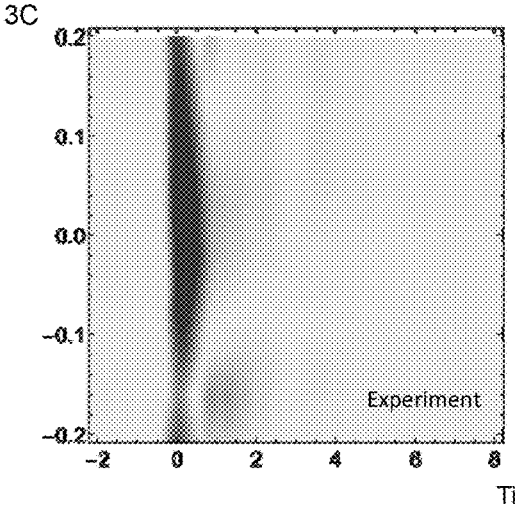
Figure 3F:
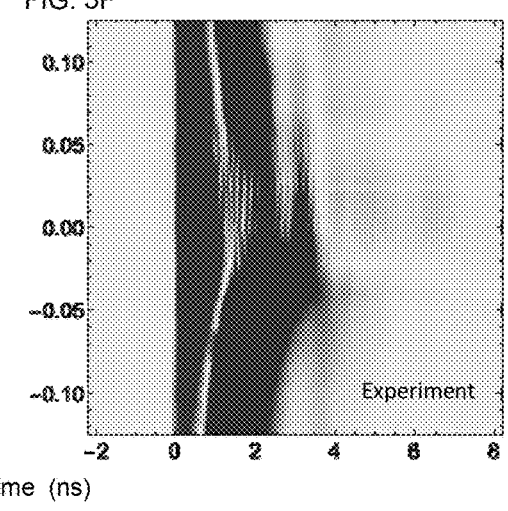

Here, a lithium niobate phase modulator was attached to the tunable infrared laser. First, the pump light was tuned into the considered resonance of the device. Then, a function generator was utilized to repeatedly generate the square-wave signal with a period of about 200 ns to activate the phase modulator. The rising edge of the square wave had a transition time under 50 ps with a slight deviation from the ideal step function (the plot in inset of FIG. 1B). Upon the traversal of the so-modulated pump light through the micro-resonator containing device on the chip, the irradiative output was registered at the output port with a 1-GHz-bandwidth infrared optical detector. A 4 GHz bandwidth oscilloscope recorded the signal output from the detector. To mitigate the electric noise of the detector circuit, the oscilloscope was configured to average a hundred cycles of the received signals. The determination of the coupling regime was carried out by assessing the shape of the of the time-dependent response are each resonance (FIG. 2C even with the non-ideal phase shift applied to the input pump light. Finally, according to the time trace at each resonance, the values of $\gamma_c$ and $\gamma_i$ were summarized in FIG. 2B. Most of the resonances were found to represent the over-coupling regime of the corresponding micro-resonator-which were the same regimes for operating in which such resonator was designed. However, several resonances indicated the under-coupling regime of the corresponding micro-resonators. These exceptions were highly likely caused by the extra internal loss due to the mode coupling. The results provide an example of the situation where unintended changes in internal losses will likely be ignored when the conventional thinking approach is at play, thereby leading to the overall false claims on coupling constants of the micro-resonators on the chip.

It was also proven that the proposed approach is insensitive to detuning, which makes it a more robust technique under varying operating conditions. With detuning $\Delta$, the transmission becomes $$\frac{P_{out}(\Delta, t)}{P_{in}} = \left|1 - \frac{2\gamma_c}{\gamma - 2i\Delta}\left(1 - 2e^{-(\gamma - 2i\Delta)t/2}\right)\right|^2$$

The output-input power ratio could still be less than one at a range of detuning compared to the linewidth. The detune-dependent response was then tested for the under-coupled resonance at 1504.7 nm and one over-coupled resonance at 1551.7 nm. The experimental and simulation results of both cases under the practical phase shift are shown in FIGS. 3A through 3F, confirming that the distinguishability between the coupling regimes was robust under a moderate detuning within approximately $(-\gamma/3, \gamma/3)$.

Overall, the implementation of the rapid $\pi$-phase shift of the on-resonance pump light was successfully applied to disturbing the time-dependent power transmission of a target micro-resonator, from which the coupling regime was reliably determined without any preliminary assumption and/or fitting of experimental data. In a situation with unanticipated frequency-dependent losses across adjacent resonances (caused by the neighboring operationally wavelength-dependent devices present in the vicinity of the target micro-resonator), the proposed methodology is believed to be perhaps the quickest and simplest venue to check the coupling regime of each of the present devices. In practice, this approach benefits from having a self-referenced criterion that neither relies on any absolute parameter of the procedure (such as accurate frequency-scanning speeds) nor requires any comparison with other data.

In stark advantageous contradistinction with the conventionally used ring-down technique, the proposed methodology is incomparably simpler and easier to assemble and operate. Moreover, the embodiment of the invention is even insensitive to noise in electronic signals or detuning of the source of pump light. All these features make this approach more effective and robust than other methods, especially in the massive manufacturing and testing of photonic chips with micro-resonators. It also allows researchers to confirm their hypothesis of coupling conditions in an accurate, fast, and low-cost pathway.

An additional advantage of the proposed use of the $\pi$-phase-shifted pump light over the use of spectrally-chirped pump light (as used in related art) is the insubstantial response to additional dispersion. Basically, the chirping pump has a rectangular Fourier spectrum since its frequency varies. If other components within the integrated optical circuit provide significant dispersion near the resonance, the chirping of the pump light and the strategy of fitting need to be modified accordingly. Other frequency-sweeping and fitting-based techniques also have similar issues. At the same time, the proposed used of the $\pi$-phase-shifted pump light at a constant wavelength has more resistance to unknown dispersion since its Fourier spectrum is centralized at a single frequency. Therefore, to test each element of a deep integrated photonic circuit, independent characterization of a resonance with less cross-talk with other neighboring device components is easily realized.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, embodiments have been described in a way that enables a clear and concise specification to be written, but it is intended and is appreciated that substantially all features described herein are applicable to/in every implementation of the invention.

In addition, while the invention may be embodied in software, the functions necessary to implement the invention may optionally or alternatively be embodied in part or in whole using firmware and/or hardware components (such as combinatorial logic, Application Specific Integrated Circuits or ASICs, Field-Programmable Gate Arrays or FPGAs, or other hardware or some combination of hardware, software and/or firmware components), and may include an specific electronic circuitry or a processor controlled by instructions stored in a tangible, non-transient memory medium. The computer-usable or computer-readable medium may be, for example, an electronic, magnetic, optical, electromagnetic, infrared, or semiconductor system, apparatus, device, or propagation medium. For example, computer-usable or computer-readable medium may include a tangible non-transitory storage medium, such as, without limitation, a random-access memory (RAM), a read-only memory (ROM), an erasable programmable read-only memory (EPROM or Flash memory), a compact disc read-only memory (CDROM), and/or an optical storage memory medium, or any other memory, or combination thereof, suitable for storing control software or other instructions and data. The computer-usable or computer-readable medium may comprise and/or be complemented with an apparatus that contains, stores, communicates, propagates, or transports program code for use by or in connection with the instruction execution system, apparatus, or device. The computer program product may comprise program code stored in a computer readable medium that, when executed on a computing device, causes the computing device to perform and/or govern one or more of the processes described herein. The computer program product can be written in any conventional programming language (such as, in one example, C++) or the like.

For the purposes of this disclosure and the appended claims, the use of the terms "substantially", "approximately", "about" and similar terms in reference to a descriptor of a value, element, property, or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The term "and/or", as used in connection with a recitation involving an element A and an element B, covers embodiments having element A alone, element B alone, or elements A and B taken together.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

What is claimed is:

1. A method comprising:
   coupling, into an input port of a chosen optical micro-resonator of multiple optical micro-resonators contained in an integrated photonic circuitry, a pump light having an operational wavelength that is substantially equal to a resonant wavelength of the chosen optical micro-resonator;
   while maintaining said operational wavelength substantially constant, substantially inverting a phase of the pump light at the input port during time that is shorter than a lifetime of the chosen optical micro-resonator; and
   based on an optical response acquired at an output port of the chosen optical micro-resonator with an optical detector of an optical detection system, generating indicia representing a cavity coupling rate of the chosen optical micro-resonator.

2. A method according to claim 1, wherein said coupling includes coupling said pump light that has already traversed an optical medium configured to be subjected to an electrical signal that has a pre-determined temporal profile.

3. A method according to claim 1, wherein the method is devoid of using an optical frequency-chirped signal and/or wherein said inverting includes introducing a phase shift substantially equal to a $\pi$-phase shift to the pump light using a driving waveform that is substantially equivalent to a step-function.

4. A method according to claim 3, further comprising:
   acquiring the optical response at the output port of the chosen optical micro-resonator by measuring a time-dependent output optical power.

5. A method according to claim 4, wherein said substantially inverting the phase of the pump light includes inverting the phase of the pump light periodically in time.

6. A method according to claim 1, further comprising:
   acquiring the optical response at the output port of the chosen optical micro-resonator by measuring a time-dependent output optical power.

7. A method according to claim 6, further comprising comparing the time-dependent output power substantially continuously recorded at the output port within a pre-determined duration of time with a value of an average output power recorded at the output port within said pre-determined duration of time to determine a coupling regime of the chosen optical micro-resonator.

8. A method according to claim 1, wherein said substantially inverting the phase of the pump light includes inverting the phase of the pump light periodically in time.

9. A method according to claim 8, further comprising comparing the time-dependent output power substantially continuously recorded at the output port within a pre-determined duration of time with a value of an average output power recorded at the output port within said pre-determined duration of time to determine a coupling regime of the chosen optical micro-resonator.

10. A method according to claim 7, wherein said generating indicia includes generating, with an electronic circuitry, a user-perceivable output representing whether a sign of a difference between the value of time-dependent output power and the value of the average output power changed at any moment within the pre-determined duration of time.

11. A method according to claim 9, wherein said generating indicia includes generating, with an electronic circuitry, a user-perceivable output indicating whether a sign of a difference between the value of time-dependent output power and the value of the average output power changed at any moment within the pre-determined duration of time.

12. A method according to claim 9, wherein said inverting the phase of the pump light is carried out at a substantially regularly occurring time intervals, wherein said pre-determined duration of time includes at least one full time interval of said regularly occurring time intervals.

13. A method according to claim 10, wherein said inverting the phase of the pump light is carried out at a substantially regularly occurring time intervals, wherein said pre-determined duration of time includes at least one full time interval of said regularly occurring time intervals.

14. A method according to claim 1, wherein said generating indicia includes:
generating a first indicia that identify the chosen optical micro-resonator as an under-coupled optical micro-resonator when a value of said optical response does not cross a pre-determined threshold level of said optical response, and/or
generating a second indicia that identify the chosen optical micro-resonator as an over-coupled optical micro-resonator when the value of said optical response does cross the pre-determined threshold level of said optical response.

15. A method according to claim 14, wherein said pre-determined threshold level of the optical response includes a level corresponding to an average value of said optical response.

16. A method according to claim 3, wherein said generating indicia includes:
generating a first indicia that identify the chosen optical micro-resonator as an under-coupled optical micro-resonator when a value of said optical response does not cross a pre-determined threshold level of said optical response, and/or
generating a second indicia that identify the chosen optical micro-resonator as an over-coupled optical micro-resonator when the value of said optical response does cross the pre-determined threshold level of said optical response.

17. A method according to claim 16, wherein said pre-determined threshold level of the optical response includes a level corresponding to an average value of said optical response.

18. A method according to claim 1, devoid of a step of numerically fitting said optical response.

19. An apparatus comprising:
a source of pump light configured to generate light at a pre-determined frequency;
a system configured to introduce a shift into a phase of the light received from the source of pump light to transform the light to a phase-shifted light and to deliver the phase-shifted light to a first location;
an optical detection system configured to receive the phase-shifted light from a second location that is different from the first location upon propagation from the first location to the second location; and
electronic circuitry operably coupled with the optical detection system and configured to determine, based on parameters of said phase-shifted light registered at the second location when a resonant medium is present between the first and second locations, a coupling rate representing said resonant medium,
wherein the resonant medium has a resonance frequency that is substantially equal to the pre-determined frequency, an input port at the first location configured to receive the phase-shifted light from the system, and an output port at the second location configured to out-couple the phase-shifted light that has traversed the resonant medium from the input port to the output port towards the optical detection system.

20. A method comprising:
with the use of the apparatus according to claim 19,
coupling, into the input port of the resonant medium, the light having the pre-determined frequency substantially equal to the resonance frequency of the resonant medium;
while maintaining said pre-determined frequency substantially constant, inverting a phase of said light during time having a duration shorter that a lifetime characterizing the resonant medium; and
with the use of electronic circuitry and based on an optical response acquired at the output port with an optical detector of the optical detection system, generating indicia representing the coupling rate.

* * * * *